United States Patent
Viswanathan et al.

(10) Patent No.: US 10,235,449 B1
(45) Date of Patent: Mar. 19, 2019

(54) EXTRACTING PRODUCT FACETS FROM UNSTRUCTURED DATA

(71) Applicant: Amazon Technologies, Inc., Seattle, WA (US)

(72) Inventors: Krishnamurthy Koduvayur Viswanathan, Seattle, WA (US); Debprakash Patnaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 471 days.

(21) Appl. No.: 14/866,694

(22) Filed: Sep. 25, 2015

(51) Int. Cl.
  *G06Q 30/00* (2012.01)
  *G06F 17/30* (2006.01)
  *G06Q 30/06* (2012.01)
  *G06F 17/21* (2006.01)

(52) U.S. Cl.
  CPC ...... *G06F 17/30684* (2013.01); *G06F 17/218* (2013.01); *G06F 17/30654* (2013.01); *G06F 17/30696* (2013.01); *G06F 17/30864* (2013.01); *G06F 17/30867* (2013.01); *G06Q 30/0603* (2013.01); *G06Q 30/0625* (2013.01)

(58) Field of Classification Search
  None
  See application file for complete search history.

(56) References Cited

U.S. PATENT DOCUMENTS

| | | | | |
|---|---|---|---|---|
| 8,327,128 | B1 * | 12/2012 | Prince | H04L 63/0823 713/150 |
| 2009/0138320 | A1 * | 5/2009 | Schmidt | G06Q 10/06 705/14.4 |
| 2010/0275149 | A1 * | 10/2010 | Vuong | G06F 17/212 715/780 |
| 2011/0289026 | A1 * | 11/2011 | Kannan | G06F 17/30997 706/12 |
| 2012/0330702 | A1 * | 12/2012 | Kowalski | G06Q 10/00 705/7.11 |
| 2013/0282704 | A1 * | 10/2013 | Pantel | G06F 17/30867 707/723 |

(Continued)

OTHER PUBLICATIONS

Kannan, Anitha, Matching Unstructured Product Offers to Structured Product Specifications, Aug. 21, 2011, ACM, pp. 404-412 (Year: 2011).*

(Continued)

*Primary Examiner* — William J Allen
*Assistant Examiner* — Timothy J Kang
(74) *Attorney, Agent, or Firm* — Kilpatrick Townsend & Stockton LLP

(57) ABSTRACT

Disclosed is a platform for assessing queries related to a catalog entry. The platform is able to determine what attributes of the catalog entry the query is directed to using one or more language processing techniques. Once an attribute is identified, the platform may check for appropriate unit types and/or formats based on a category associated with the attribute. The platform then parses additional data associated with the catalog entry (or another catalog entry within the same browse node) to identify a set of potential values for the identified attribute. One or more rule sets may be used to filter the set of potential values to a single probable value, which may then be provided in a response to the query.

20 Claims, 8 Drawing Sheets

(56) References Cited

U.S. PATENT DOCUMENTS

| | | | |
|---|---|---|---|
| 2014/0278406 A1* | 9/2014 | Tsumura | G06Q 10/06 704/235 |
| 2015/0170248 A1* | 6/2015 | Chung | G06F 17/3053 705/26.63 |
| 2015/0317649 A1* | 11/2015 | Joshi | G01C 21/20 705/7.32 |
| 2015/0356188 A1* | 12/2015 | Konik | G06F 17/30867 707/706 |
| 2016/0078489 A1* | 3/2016 | Hu | G06Q 30/0269 705/14.66 |
| 2016/0321358 A1* | 11/2016 | Kanani | G06F 17/277 |

OTHER PUBLICATIONS

U.S. Appl. No. 14/314,962, filed Jun. 25, 2014, Titled: Attribute Fill Using Text Extraction.

* cited by examiner

EXTRACTING PRODUCT FACETS FROM UNSTRUCTURED DATA

BACKGROUND

Information stored in a data store maintained by a number of online service providers can become quite extensive. Users of these online service providers are often inundated with information, sometimes presented multiple times in different formats, making any single piece of information difficult to locate. Because of the multiple different ways in which the information may be presented, online service providers are often not able to utilize it. Additionally, queries submitted by a user may go unnoticed and/or unanswered.

BRIEF DESCRIPTION OF THE DRAWINGS

Various embodiments in accordance with the present disclosure will be described with reference to the drawings, in which.

DETAILED DESCRIPTION

Figure 1:
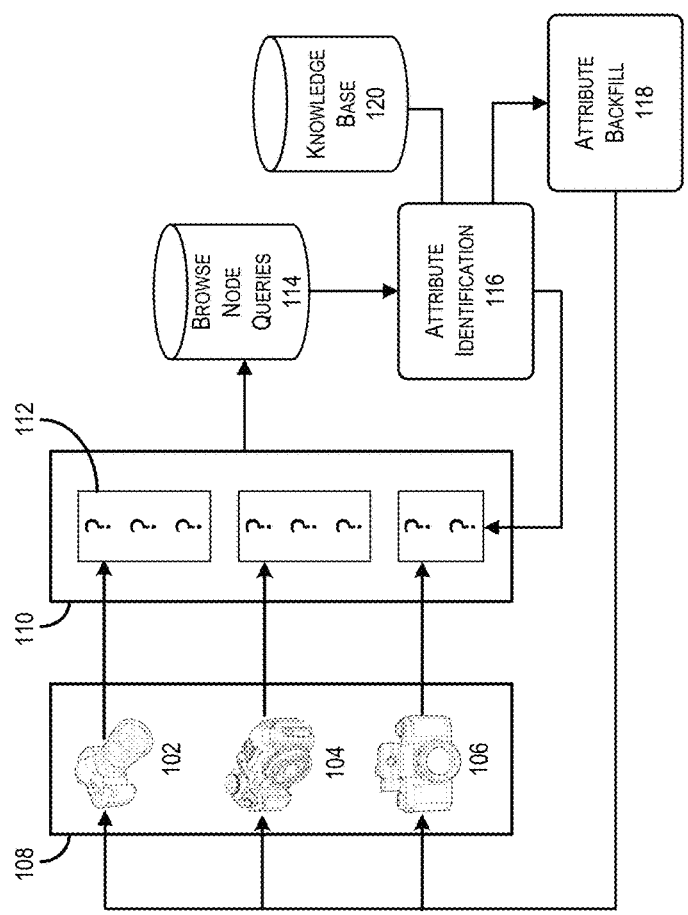
FIG. 1 depicts an illustrative example platform for processing unstructured data to identify and populate attributes.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include an automatic and scalable approach for discovering useful browse node attribute values from unstructured or semi-structured data (such as queries). In some cases, queries or other unstructured data provided by users may be used to indicate one or more important attributes of a browse node (e.g., a browse node of a catalog of items offered by an electronic marketplace). The disclosed techniques may be utilized to identify the attribute, add the attribute to the browse node, and/or process candidate values from the unstructured data to provide a response to the query.

In some embodiments, multiple queries (e.g., user questions entered using unstructured alphanumeric text and natural language) may be received that are related to a particular browse node. It may be determined, from processing those queries, that there is a high level of interest in one or more attributes specific to that browse node. Once identified, a service provider may subsequently append the attribute to each catalog entry associated with the browse node and may then autofill or backfill the attribute. In some embodiments, a new query may be received by a service provider for a particular catalog entry associated with a browse node. The service provider may identify an attribute related to the received query and may subsequently parse additional unstructured data and/or catalog entry data to identify candidate values for the attribute. The most likely candidate value may then be identified and provided in a response to the received query. A catalog entry may be any item available from an electronic catalog, to include digital content. For example, the catalog entry for an item may include one or more attributes with values that characterize the item. A browse node may be any category or grouping of catalog entries. For example, "laptops" might be a browse node for an online retailer, whereas a particular model of laptop may be a catalog entry.

By way of illustration, a user may submit a query related an attribute of a catalog entry to a an electronic retailer offering that catalog entry. For example, User A, when browsing laptops, may submit the query "does this laptop have an SSD hard drive?" In this example, another user in a user community may or may not respond to the query. In the event that the query is unanswered, a natural language processing component may parse User A's query, along with hundreds of others to identify the substance of the query. The natural language processing component may identify the has_ssd attribute as being relevant to User A's query. The electronic retailer may then determine, from a review by User B, that the attribute's value is true. A response module may then be triggered to respond to User A's query with the text "Yes, User A, this laptop does have an SSD hard drive!"

In some embodiments, multiple users of an online retail platform may submit similar queries within a particular browse node. It may be determined that each of the similar queries relate to the same attribute, and users are therefore interested in that attribute with respect to the browse node. In this example, it may be beneficial for the service provider to add the attribute to the list of attributes commonly collected and presented. In another illustrative example, a user of an online retail platform may be interested in an attribute for a particular item, such as a screen size for a particular model of laptop computer. The user may submit a query to a user community associated with the online retail platform. Once submitted, the provider of the online retail platform may process the query to determine that the user is asking about the screen size attribute and may subsequently provide or confirm the screen size in an automated response.

In an electronic catalog, catalog entries (e.g., goods or services) may be broken up into product categories. This can be accomplished in a number of ways. For example, some retailers may choose to use a browse-tree, or product hierarchy, to categorize each product. In a browse-tree, each good or service may belong to a category, or browse node. The browse node may also belong to a parent browse node. For example, a laptop computer product may belong to a laptops browse node, which may be a child of the parent browse node computers, which in turn may be a child of the parent browse node electronics, etc. Additionally, a product may belong to more than one browse node. For example, a digital camera may belong to the browse node cameras as well as to the browse node electronics.

Additionally, each catalog entry available (e.g., offered) in an electronic marketplace may be associated with a number of item attributes (references). The attributes may be unique to the browse node, or they may be inherited from a parent browse node. For example, a member of the laptop browse node may have a hard_drive_capacity attribute that is inherited from the computer browse node, as well as a screen_size attribute that is not inherited. In general, attributes can be classified into structured attributes and unstructured/semi-structured attributes. Structured attributes are attributes for which the attribute value has a format, such as those that tend to comprise a number followed by a unit type. For example, the attribute hard_drive_capacity is a structured attribute that has a value indicating the number of bytes that a hard drive may store, such as 1000 GB or 1 TB. Unstructured attributes are those that have values that do not follow a format. For example, an item_description attribute may be unstructured because it can contain a number of data in any order. For that reason, structured attributes tend to be more organized, accessible, and machine understandable and thus may be used in many applications, such as indexing in facet search, comparison shopping, and/or making recommendations.

Furthermore, attributes may be considered either quantitative or non-quantitative. A quantitative attribute is one that can be measured objectively. One example of a quantitative attribute is capacity (e.g., 1 TB, 2 TB, 4 TB) of an external hard drive. A numbered unit is a quantitative reference that is structured as a number followed by a unit type, such as "15 inches" or "eight feet." A non-quantitative structured reference (NQSR) is one that has a structure but is subjective or cannot be measured objectively. Color (red, green, blue), material (gold, silver, brass), and bed size (single, full, queen, king) are good examples of non-quantitative attributes. Additionally, item attributes that indicate compatibility or those that have binary values (yes or no) may also be non-quantitative.

FIG. 1 depicts an illustrative example platform for processing unstructured data to identify and populate attributes. FIG. 1 depicts a number of catalog entries 102, 104, and 106 that may be associated with a browse node 108 provided by a service provider. A service provider is any provider of a service as described in this disclosure. In some embodiments, the service provider may compile browse node data 110 from data stored in relation to each of the catalog entries 102, 104, and 106. The compiled browse node data 110 may include unstructured query data 112. Unstructured query data may be any unstructured text and/or alphanumeric characters submitted by a user. For example, unstructured query data may be a product review or a question about the product submitted by a user. Unstructured query data 112 may be stored in a data store 114 specific to browse node queries.

A service provider may then process the unstructured query data 112 stored in data store 114 in a number of ways. For example, the service provider may utilize one or more natural language processing techniques to identify subject matter or a topic of a query. As a second example, the service provider may determine whether the tone of the query or other unstructured data is generally positive or negative with regard to the catalog entry with which it is related. The service provider may subject one or more browse node queries 114 to an attribute identification process 116, wherein an attribute is identified as being the subject of the query. For example, the service provider may determine that multiple queries related to one or more catalog entries in a browse node are related to a single attribute. The service provider may then determine whether the attribute is one that is typically stored in relation to the browse node. If it is not, then the service provider may append the attribute to a data store entry for each catalog entry in that browse node. Because the newly appended attribute is likely to be unpopulated at the time that it is appended to the catalog entry, the attribute may be subjected to an attribute backfill process 118. An attribute backfill process 118 may be any process designed to populate an empty attribute with a value based on either structured or unstructured data related to the catalog entry. For example, Wu et al., "ATTRIBUTE FILL USING TEXT EXTRACTION," U.S. application Ser. No. 14/314,962, filed Jun. 25, 2014 discloses one example of an attribute backfill process 118, and is hereby incorporated into the current disclosure by reference.

In some embodiments, the service provider may categorize browse node queries 114 according to catalog entry and/or an identified attribute associated with the browse node query. For example, the service provider may categorize all queries directed to the color of a laptop as being associated with laptop color. In addition, laptop color queries may be stored in relation to the laptop that they concern. This categorized data may be stored in a knowledge base 120, which may be any data store having information indexed by type.

Figure 2:
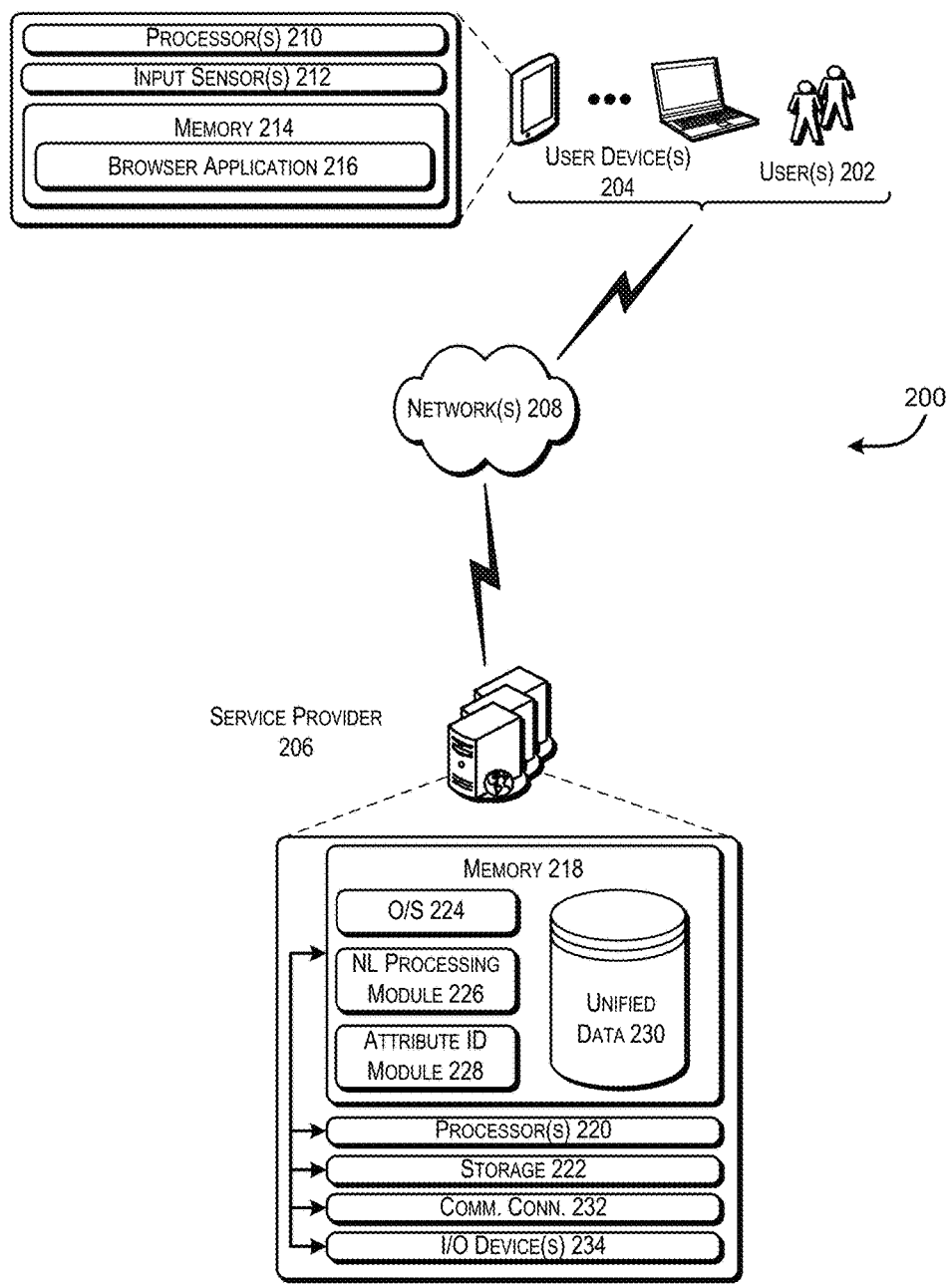
FIG. 2 depicts an illustrative example of a system or architecture in which techniques for identifying attributes from queries for a browse node may be implemented.

FIG. 2 depicts an illustrative example of a system or architecture 200 in which techniques for identifying attributes from queries for a browse node may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search module sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 218 and one or more processing units (or processor(s)) 220. The processor(s) 220 may be implemented as appropriate in hardware, computer-executable instructions, firmware or combinations thereof. Computer-executable instruction or firmware implementations of the processor(s) 220 may include computer-executable or machine executable instructions written in any suitable programming language to perform the various functions described.

The memory 218 may store program instructions that are loadable and executable on the processor(s) 220, as well as data generated during the execution of these programs. Depending on the configuration and type of service provider 206, the memory 218 may be volatile (such as random access memory (RAM)) and/or non-volatile (such as read-only memory (ROM), flash memory, etc.). The service provider 206 may also include additional storage 222, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM) or ROM. Turning to the contents of the memory 218 in more detail, the memory 218 may include an operating system 224 and one or more application programs or services for implementing the features disclosed herein including at least a module for identifying one or more attributes to which a query is related (language processing module 226), and/or a module for identifying an appropriate response to a query (attribute identification module 228). The memory 218 may also include unified data 230, which provides data related to items in an electronic catalog and/or information provided by a user community. In some embodiments, the unified data 230 may be stored in a database.

The memory 218 and the additional storage 222, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 232 that allow the service provider 206 to communicate with a stored database, another computing device or server, user terminals, and/or other devices on the network(s) 208. The service provider 206 may also include input/output (I/O) device(s) and/or ports 234, such as for enabling connection with a keyboard, a mouse, a pen, a voice input device, a touch input device, a display, speakers, a printer, etc.

Turning to the contents of the memory 218 in more detail, the memory 218 may include an operating system 224, a database containing unified data 230 and the one or more application programs or services for implementing the features disclosed herein, including a language processing module 226 and/or an attribute identification module 228.

In some embodiments, the language processing module 226 may be configured to parse unstructured data, such as received queries, and identify one or more attributes of an item that are likely the topic of a particular piece of data. To do this, the language processing module 226 may use language rules/and or word-phrase formats to identify the likely attribute. For example, a user may submit the query "what is the resolution of this television?" In this example, the language processing module 226 may identify the phrase "what is the" as typically being followed by an attribute. Furthermore, the language processing module 226 may identify the phrase "this television" as a reference to a category of items associated with a browse node. The language processing module 226 may then determine that the query relates to the attribute of "resolution." In some embodiments, the language processing module 226 may index and/or categorize a number of queries such that they are grouped by attribute. This allows the service provider to analyze how the query was answered with relation to other items within the browse node.

In some embodiments, the attribute identification module 228 may be configured to identify a list of candidate values for an attribute and, from that list, determine a most likely candidate value for the attribute. For example, the attribute identification module 228 may analyze answers to similar queries that were posted for another catalog entry within the same browse node. The attribute identification module 228 may identify a word, a phrase, or format (e.g., a value followed by a unit type). The attribute identification module 228 may then parse through structured and unstructured text data to identify words and phrases (and their synonyms) that match the identified format.

In some embodiments, the most likely candidate value may be the greatest (or largest) candidate value found by the attribute identification module 228. In some embodiments, the most likely candidate value may be the least (or smallest) candidate value found by the attribute identification module 228. In some embodiments, the most likely candidate value may be the candidate value found by the attribute identification module 228 which occurs most often in the list of extracted values. In some embodiments, the attribute identification module 228 may be configured to remove unlikely values from the list of candidate attribute values until one value remains. The attribute identification module 228 may do this by applying rules to attribute values. In some embodiments, the attribute identification module 228 may remove values from the list that are outside of a range of potential values for that attribute.

In some embodiments, priorities may be assigned to candidate values by the attribute identification module 228. Priorities may be pre-determined or they may be based on rules. For example, "large" is a substring of "x-large," so "x-large" may be assigned a higher priority than "large." In this example, if both "large" and "x-large" are found in the item data, "x-large" is assigned a higher value, so that it is more likely to be chosen as the appropriate attribute value. In some embodiments, a priority may be assigned to each value according to the probability that the value is correct. For example, a ruleset may indicate that values following or proceeding particular words and/or phrases are more likely to be the correct value than those following or proceeding other words and/or phrases. In some embodiments, a value with a higher number of occurrences may be given a higher priority. For example, if the value "5" appears 12 times, and the value "3" appears six times, then the value "5" may be assigned a higher priority than the value "3."

Unified data 230 may include data from a number of data sources, including information provided by a vendor of a catalog entry when posting the catalog entry to a service provider's electronic catalog, information related to comments and/or questions posted by one or more users in an online user community, and/or information derived from one or more network documents related to a catalog entry.

Figure 3:
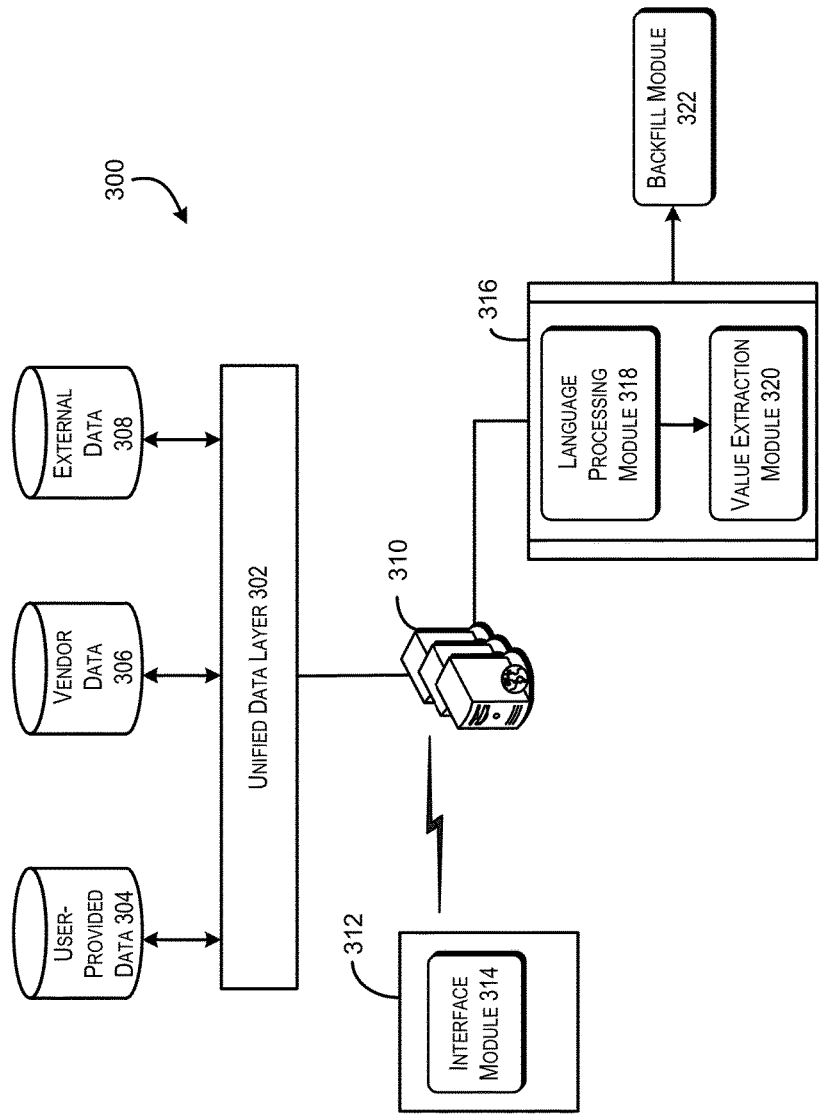
FIG. 3 depicts a diagram 300 that illustrates an example of a data communication flow and presentation in accordance with at least some embodiments of the disclosure.

FIG. 3 depicts a diagram 300 that illustrates an example of a data communication flow and presentation in accordance with at least some embodiments of the disclosure. In FIG. 3, a unified data layer 302 is depicted as a data layer interacting with data from various data stores 304, 306, and 308. Unified data layer 302 is an example of unified data 230 of FIG. 2. Data stores 304, 306, and 308 may include one or more separate data sources containing user-provided data 304 (e.g., data provided by one or more members of a user community), vendor data 306 (e.g., data provided by a vendor of a catalog entry in an electronic catalog), or data provided by external entities 308 (entities external to service provider 310 such as a product homepage). The active unified data layer 302 may aggregate and store data from any number of data stores 304, 306 and 308. Data stored in a unified data layer may be updated from data stores dynamically as new information is received.

In accordance with at least one embodiment, unified data layer 302 may be stored on, or accessible by, an service provider 310. Service provider 310 is an example service provider 206 of FIG. 2. In addition to accessing data located in unified data layer 302, service provider 310 may send data to or receive data from a user device 312. User device 312 may be a mobile device in accordance with at least some embodiments. Through user device 312, service provider 310 may provide data to a user via an interface module 314. For example, the interface module 314 may be an application with a graphic user interface (GUI) available on user device 312 (e.g., a browser interface). The service provider 310 may receive one or more queries related to various catalog entries from user device 312.

In accordance with at least some embodiments, the information received by service provider 310 may be processed at sub-process 316. In sub-process 316, a language processing module 318 may identify a topic of a received query. In at least some embodiments, language processing module 318 may be an example language processing module 226 of FIG. 2. In at least some embodiments, the language processing module 318 may receive a query from user device 312 related to one or more catalog entries. The language processing module 318 may be configured to identify one or more attributes associated with the query. In some embodiments, the language processing module 318 may identify key words and/or phrases that are likely to indicate an attribute value. For example, a user may submit the query beginning with "what is the . . . " In this example, the language processing module 318 may identify the phrase "what is the" as typically being followed by an attribute. In addition, the language processing module 318 may identify value/unit pairs (e.g., 3 TB, 4 ft, 9 in, etc.) that are indicative of an attribute value. The language processing module 318 may then determine which attribute is likely being referenced based on the unit type (e.g., TB, ft, in, etc.). The language processing module 318 may also determine the type, or format, of an attribute value. For example, a query that begins with the word "is" is likely to require a "yes" or a "no" response. However, if the query also contains the word "or," then the appropriate attribute value may be one of the phrases in the query itself.

Some embodiments of the current disclosure may include an value extraction module 320 configured to determine or verify a value for the identified attribute. The value extraction module 320 may parse both structured text and/or unstructured text to identify potential candidate values for the attribute. For example, the value extraction module 320 may parse information provided by a vendor associated with the catalog entry in order to identify potential candidate values. In addition, the value extraction module 320 may parse unstructured text, such as other queries and responses, user reviews of the catalog entry, or other suitable comment data, to identify potential candidate values.

In some embodiments, the value extraction module 320 may utilize one or more rules to filter the potential candidate values into a single probable candidate value. For example, if the value extraction module 320 needs to extract color from the following unstructured text: "Black—PropUp iPad Stand—Ergonomic Holder for Apple iPad Versions 1-4, not iPad Air. Pink and Green also available," the value extraction module 320 should identify three candidate values: "Black," "Pink," and "Green." The value extraction module 320 may be configured to determine, based on the context, that "Black" is the correct value, rather than "Pink" or "Green." In some embodiments, the value extraction module 320 may be configured to use a rule module which is described in more detail below.

Some embodiments of the current disclosure may include a backfill module 322 configured to append the identified attribute to a set of attributes associated with the catalog entry and backfill the attribute with the probable candidate value. For example, if a plurality of users are requesting information related to a particular attribute for each catalog entry associated with a browse node, then it may be beneficial for the service provider to add that attribute to the browse node. In this scenario, the attribute may be added as an empty (or null) value and populated for each catalog entry according to the most likely candidate value for that catalog entry.

Figure 4:
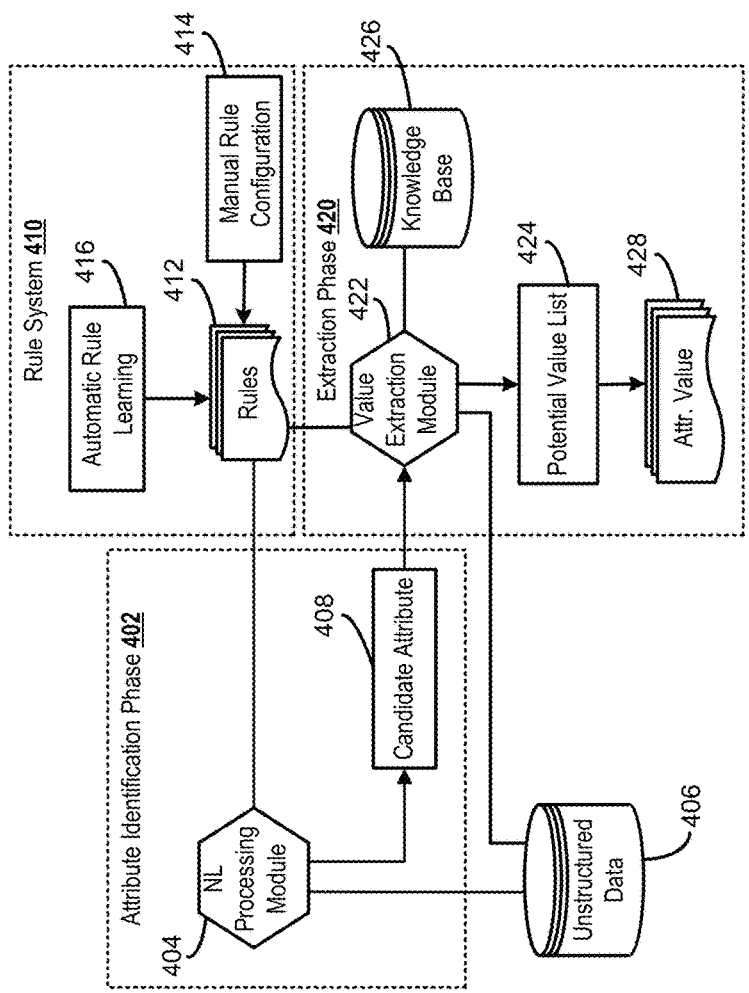
FIG. 4 depicts an illustrative example process diagram for a system that identifies an attribute associated with a query and determines an appropriate value with which to populate a response.

FIG. 4 depicts an illustrative example process diagram for a system that identifies an attribute associated with a query and determines an appropriate value with which to populate a response. During the attribute identification phase 402 of process 400, a processing module 404 may tokenize and parse unstructured data 406 to identify a candidate attribute 408 in which users are interested. The unstructured data 406 may be any unformatted attribute associated with the item, such as the title, description or a review of the item. The rule system 410 may comprise a set of rules 412 for processing text. In some embodiments, the processing module may utilize a set of language processing rules from a rule system 410. In some embodiments, a system administrator or user may manually configure rules in the set of rules as depicted by 414. In some embodiments, rules may be set using machine learning algorithms 416, including algorithms that use workforce auditing (such as crowdsourcing platforms). For example, one or more machine learning algorithms may be trained on past query data for a catalog entry. In this example, the actual responses to the query may be used to provide feedback for the machine learning algorithms. During the attribute identification phase 402 of process 400, the processing module 404 may utilize language processing rules from rule system 406 to identify a candidate attribute 408 from unstructured data 406.

Once a candidate attribute 408 has been identified in the attribute identification phase 402, the value extraction phase 420 of process 400 may identify one or more potential values for the candidate attribute. During this phase, a value extraction module 422 may create a list of potential values 424 for the candidate attribute by tokenizing and parsing data. Additionally, a knowledge base 426 may be mined to identify known variants of an attribute or attribute value. For example, the knowledge base may contain information on synonyms or equivalent phrases that may comprise an attribute or value. The knowledge base may also include unit types for various attribute categories. For example, an attribute that fits within a "distance" category of attributes may be measured in centimeters, inches, miles, etc. The list of potential values for the candidate attribute is then filtered to one probable attribute value 428.

In some embodiments, each potential value in the list of potential values may be assigned a priority, or weight, representing the likelihood that the potential value is correct. Priorities may be assigned to each potential value based on a number of factors. For example, each potential value in the list may be prioritized based on the number of times that the potential value is found in the parsed and tokenized data. In some embodiments, the service provider may determine a range of potential values based on the attribute's value related to other catalog entries within the same browse node. For example, if the service provider determines that a RAM attribute for catalog entries within the laptop browse node range from 4 to 16 gb, then a 500 gb value is unlikely to be the correct value for a current RAM attribute and may be given a lower priority. In this example, a potential value of 8 gb may be given a higher value because it is within the range. In some embodiments, language rules may be used to assign a priority to each value. For example, language rules may indicate that certain words and/or phrases are more likely to proceed or follow correct values. Once each value in a set of potential values is assigned a priority, the value with an optimal (e.g., highest) priority may be chosen as the probable value.

Figure 5:
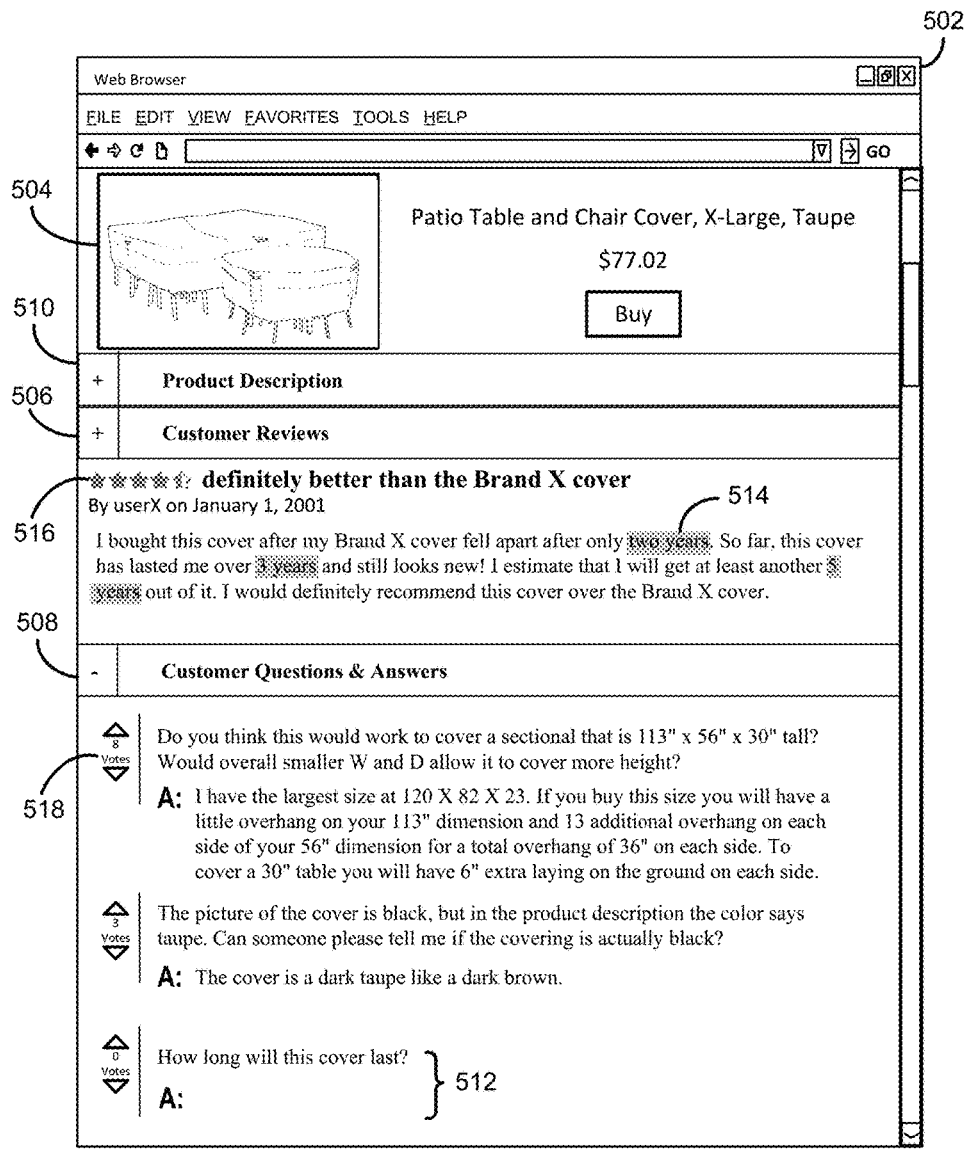
FIG. 5 depicts an illustrative example of a process for automatically responding to a submitted query.

FIG. 5 depicts an illustrative example of a process for automatically responding to a submitted query. In FIG. 5, a web browser interface 502 is depicted as being used to interact with an online retailer. In this example, the web browser 502 is accessing a network document associated with a particular catalog entry 504. The catalog entry may be associated with unstructured data, such as customer provided reviews 506 and/or customer questions and answers 508, and/or structured data, such as a vendor-provided product description 510. In some embodiments, the service provider may parse unstructured data located on a product webpage maintained by the vendor of the catalog entry.

In accordance with at least some embodiments, a user of a user community associated with the online retailer may post a query 512 related to the catalog entry 504. The query may be unstructured, in that a user is not required to follow any particular format when submitting it. In some embodiments, other users of the online community may have the ability to provide a response to the query. Once the query 512 has been posted, a language processing module, such as language processing module 318 depicted in FIG. 3, may parse the query in order to identify an attribute related to the query. In the example depicted in FIG. 5, the query "how long will this cover last" may be parsed and analyzed in light of language processing rules. In this example, the language processing module may determine, from the phrase "how long," that the user is concerned with a length of time. The language processing module may also determine, from the phrase "will this . . . last," that the user is concerned with the lifespan of the catalog entry. In this example, the language processing module might identify that a "lifespan" attribute is the candidate attribute associated with the query 512.

Once the candidate attribute has been identified, a list of potential values for the candidate attribute may be extracted from data related to the catalog entry by a value extraction module, such as value extraction module 320 depicted in FIG. 3. The value extraction module may query a knowledge base to identify unit types associated with a lifespan, or a length of time. The knowledge base may include information on unit types (e.g., years, minutes, hours, etc.), potential ranges (e.g., between 1 and 3 years), and/or conversions (e.g., 1 minute=60 seconds). The value extraction module may then parse structured data and/or unstructured data to identify potential attribute values for the identified candidate attribute. Continuing with the example depicted in FIG. 5, the value extraction module may determine that a lifespan attribute should be presented in units of time. The knowledge base may provide unit types related to time as well as their synonyms and/or symbols (e.g., years may also be expressed as year, yrs, or y). The value extraction module may then identify several potential candidate values 514 from the data related to the catalog entry. As depicted by the highlighting, the value extraction module may identify each of "two years," "3 years," and "5 years," as potential candidate values in this example. The value extraction module may then filter the potential values to a single probable value according to one or more rules. In the current example, the value extraction module may determine that the "two years" value is related to Brand X, and not the current catalog entry. Additionally, the value extraction module may determine, from the phrase "will get . . . another," that the "5 years" value is related to an estimated future lifespan. The value extraction module may determine, from the phrase "lasted me over," that the "3 years" value is a value for the lifespan attribute. From this analysis, the value extraction module may determine that probable response is potentially "at least 3 years," or "an estimated 8 years," depending on how the rules dictate estimated future lifespan should be treated. In some embodiments, the value extraction module may determine whether the data is positively or negatively slanted toward the catalog entry. This may be determined from a rating 516 provided by a user, or it may be determined based on language rules. The value extraction module may give less weight to potential values that are extracted from data that is either too positive or too negative.

In some embodiments, potential candidate values found in some data may be weighed more heavily, or preferred, than potential candidates found in other data. For example, a potential candidate value found in the title of the catalog entry may be given more weight than a potential candidate value found in comments related to the catalog entry. In some embodiments, a user community ranking 518 may be used to assign weights to data. For example, a potential candidate that is extracted from data that is highly rated by the user community may be chosen over a potential candidate that is extracted from data that is lower rated by the user community.

Figure 6:
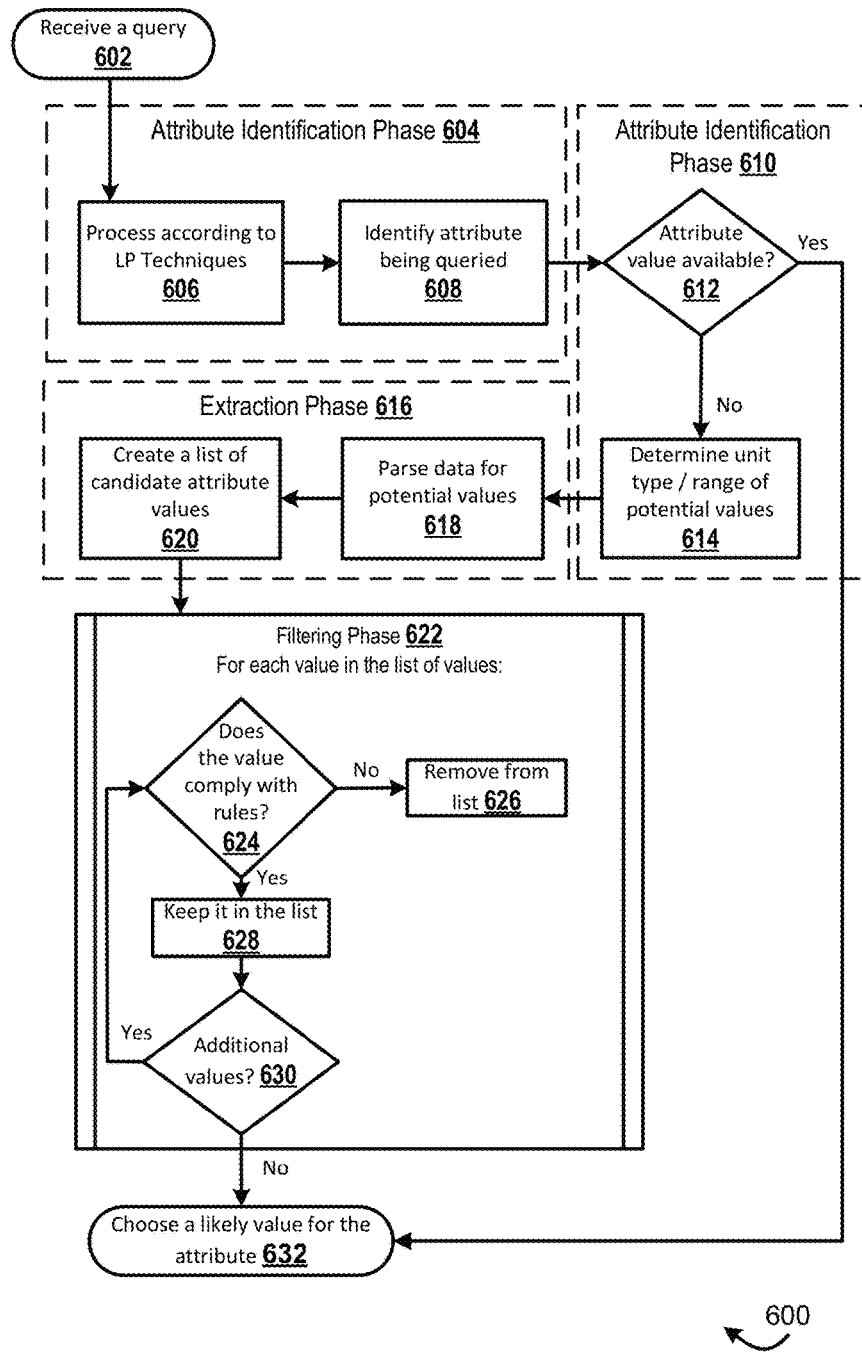
FIG. 6 depicts an illustrative flow chart demonstrating an example automated response system for providing timely attribute information in response to a received query in accordance with at least some embodiments.

FIG. 6 depicts an illustrative flow chart demonstrating an example automated response system for providing timely attribute information in response to a received query in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

Process 600 may begin at 602 when a query is received by a service provider. The received query may be processed at attribute identification phase 604 according to one or more language processing techniques at 606 in order to identify an attribute related to the received query at 608. At attribute identification phase 604, process 600 may identify an attribute according to the context of the query, units expressed in the query, phrases used in the query, or any other suitable method of evaluating the language of the query. In some embodiments, one or more machine learning and/or pattern recognition techniques may be applied to the query to identify the attribute. For example, the service provider may analyze query and response patterns for similar queries regarding different catalog entries within the same browse node. In this example, the service provider may identify a substantially similar query submitted by a user for another catalog entry within the same browse node. The service provider may then identify a response format, a unit type, a range of values, or any other data relevant to the current query.

Once the attribute has been identified, the service provider may enter an attribute identification phase 610 to determine whether a value for the attribute is readily available at 612. For example, the service provider may determine that the user is asking about an attribute for which the value was supplied by the vendor, but which is not readily available to the user. This might be the case when a vendor has supplied more information than the service provider has requested. In this example, the service provider may simply provide the vendor-supplied value to the user in response to the query. If the attribute's value is not readily available, then the service provider may attempt to extract it from data related to the catalog entry. To do this, the service provider may first determine what unit type and/or range is associated with the attribute at 614. This may be done by identifying, from the context of the query, a category for the attribute value. For example, the attribute may be categorized as a "distance" attribute, a "size" attribute, a "length of time" attribute, a "color" attribute, or any other suitable category of attributes. The service provider may then identify a unit type associated with that attribute category.

During the extraction phase 616 of process 600, text data (both structured and unstructured) for the item are tokenized and parsed at 618. To tokenize the text data, the text is separated into words and phrases. The data tokens are then compared to the identified unit types/ranges to find matches. A parser may be configured to identify numbered unit phrases (numbers followed by a unit type) or other format types. In some embodiments, a "match" may be determined based upon the unit type that appears in the tokenized phrase being included in the list of unit types identified as being relevant to the attribute. In some embodiments of the disclosure, the tokens may be normalized before determining whether a match is present. For example, the number in the unit phrase may be converted into one of the identified unit types in order to determine whether the number is within a range provided for the attribute. Extraction phase 616 of process 600 may also take advantage of machine learning algorithms in order to improve match identification. Potential matches that are identified in extraction phase 616 may be compiled into a list of potential attribute values at 620. In some cases, duplicate attribute values in the list of potential values may be ignored. Alternatively, the service provider may assign an increased probability of being the probable attribute value to attribute values that are repeated. For some attributes, the service provider may be configured to ignore small variances in unit quantity and treat them as equivalent. For example, both 1000 GB and 1024 GB are often used to describe one Terrabyte (1 TB) and may be considered equivalent. For some attributes, small variances may need to be treated separately. For example, a 12.1 megapixel resolution attribute for a digital camera may be treated as being separate from a 12.3 megapixel resolution attribute.

During the filtering phase 622 of process 600, the list of candidate values compiled by the matching extraction phase 616 are filtered. In some embodiments, the filtering phase 622 may remove potential values from the list that are outside of the range of possible values provided at block 614. In some embodiments, the list of potential values is reduced to a smaller set of values or a single value. In some of these embodiments, a rule set may be applied to the list by a rule engine at 624. For each potential value in the list, the rule engine will determine whether to keep the value (628) or remove it from the list (626) based on the rule set provided. In some embodiments, the rule engine may filter the potential value list more than once, with the rule set altered after each iteration so that values are removed with each new running. For example, at 630, where more than a desired number of potential attributes remain in a list of potential values after the rule engine has processed the list, the range may be tightened by choosing a higher minimum value or lower maximum value. Once a single potential value (or a desired number of potential values) remains, the process 600 may exit the filtering phase 622. This single potential value, the probable attribute value, may be provided in a response to the query at 632.

In accordance with at least some embodiments, the list of candidate values may be filtered using rules developed by one or more machine learning techniques. For example, a machine learning algorithm may consume one or more features to identify a most likely value from the list of candidate values. In some embodiments, features may be speech patterns. The machine learning algorithm may be configured to identify a sentiment for a particular word or phrase based on the speech pattern, or the context in which the word or phrase is used. For example, the machine learning algorithm may be configured to learn positive and negative speech patterns in order to determine whether the word or phrase is used in a generally negative or generally positive manner toward the catalog entry. In this example, a rule set may indicate that candidate values of a particular sentiment are more likely to be correct, and hence should be given a higher priority. In some embodiments, the machine learning algorithm may select a candidate value based on the type of text in which it is found. For example, a potential candidate value found in the title of the catalog entry may be selected over a potential candidate value found in comments related to the catalog entry. A machine learning algorithm may employ blacklist language to remove unlikely candidates. For example, a rule may state that each candidate value immediately proceeded by the blacklist word "not" should be removed from the list of candidate values. In some embodiments, the machine learning algorithm may be configured to identify correlations between certain words or phrases and incorrect attribute values. The machine learning algorithm may then add these words or phrases to the list of blacklist values. In some embodiments, the machine learning algorithm may be trained to look for candidate values that appear in a particular format. As an illustrative example, the machine learning algorithm may determine that candidate values appearing in an "adjective, noun, adjective" format are more likely than those appearing in an "adjective, noun, verb" format. In this example, a candidate value having the first format may be given a higher priority than a candidate having the second format. The rule set may also include a rule to assign priorities to candidate values based on the number of times that they appear in the unstructured text.

Figure 7:
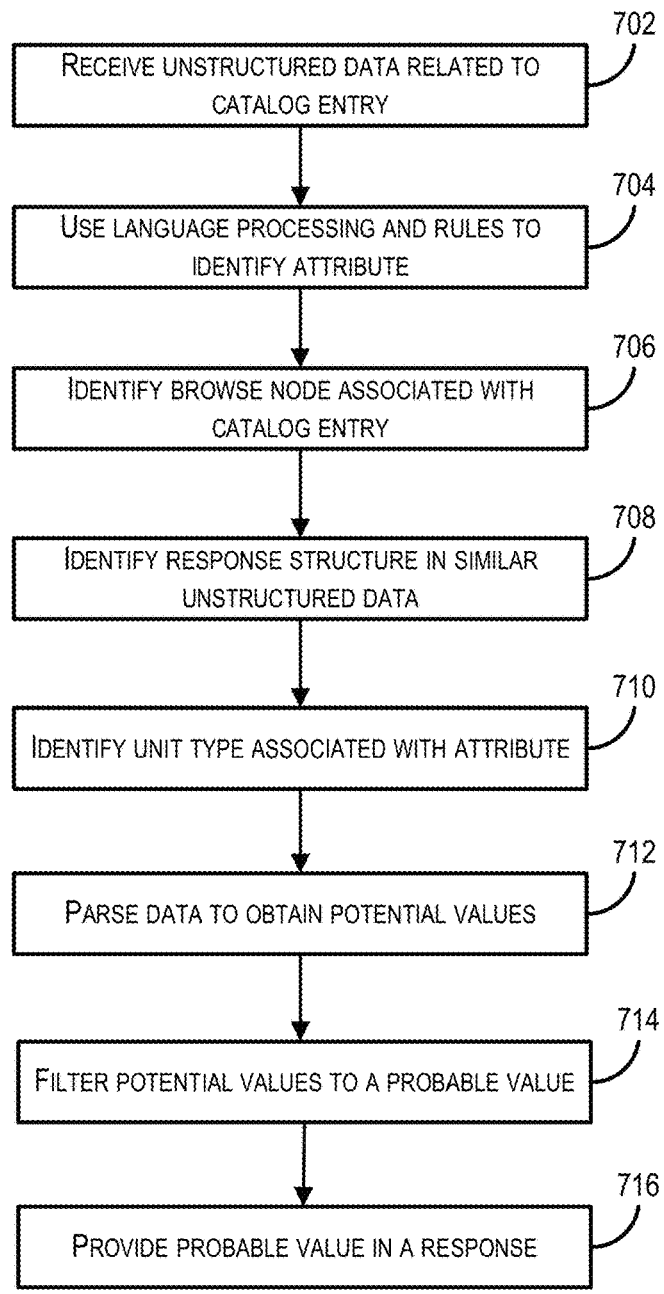
FIG. 7 depicts an illustrative flow diagram for a method of automatically providing a response to a query related to a catalog entry from related data in accordance with at least some embodiments.

FIG. 7 depicts an illustrative flow diagram for a method of automatically providing a response to a query related to a catalog entry from related data in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Process 700 may begin at 702 when at least one piece of unstructured text is received in relation to a catalog entry. In some cases, the unstructured text may be a query related to a feature or attribute of the catalog entry. In other cases, the unstructured text may be a review or comment regarding the catalog entry. At phase 704, the service provider may identify one or more attributes related to the unstructured text. To do this, the service provider may look for key words and/or phrases that indicate a type of attribute involved in the query.

As discussed above, each catalog entry may be associated with a browse node, or category. In some embodiments, the service provider, upon receiving the unstructured text, may identify the browse node associated with the catalog entry at 706. For example, the catalog entry may maintain a link to the browse node in a database table. In this example, the browse node may be identified by querying the database table. In some embodiments, the service provider may compare the unstructured text with a second unstructured text associated with other catalog entries within the identified browse node at 708. The service provider may then determine, from a response provided for the second unstructured text, a response format that may be appropriate for the current unstructured text. For example, if the unstructured text is a query posted about a catalog entry, then the service provider may determine whether that same query has been posted in relation to a different catalog entry within the same browse node. If it has, then the service provider may analyze any response provided to the query for the different catalog entry in order to determine what an appropriate response to the first query should look like.

Once an attribute and/or response format has been identified, the service provider may determine a unit type associated with the attribute at 710. In some cases, the attribute may not be associated with a unit type. For example, if the attribute is a color, then no unit type would be associated with it. The service provider may identify a unit category for the attribute in order to identify related unit types, such as "distance" units or "size" units. Some unit categories may be specific to certain browse nodes. For example, a size category that includes "small," "medium," "large," and "x-large" may be specific to a clothing browse node. Upon identifying a category of units, the service provider may parse text data associated with the catalog entry in order to identify potential values. Potential values may be identified as being paired with the unit type, or they may be known to belong to the identified unit category. For example, "red," "blue," and "green" are all known to belong to a color category. If the service provider identifies that the attribute belongs to a color category, then these terms may be identified as potential values. In this way, the service provider may compile a list of potential values at 712.

Upon obtaining a list of potential values, the service provider may analyze words and/or phrases surrounding each potential value to determine whether it is a probable value for the identified attribute at 714. For example, the service provider may look at qualifying text or text that would indicate that the value is not correct. For example, the text "this screen is not as big as Brand X's 21" screen" would indicate that the potential value of 21" is not correct. Furthermore, it may also set an upper range by indicating that the actual value is below 21". Once the service provider has identified a unit category, and in some cases a value, for the attribute, the service provider may implement one or more rules for determining which unit type is appropriate within the unit category. For example, if the unit category is a length of time then the service provider may use the unit type for which the value is easiest for a consumer to process. By way of illustration, 10 minutes is easier for a consumer to process than 0.167 hours, so a service provider would likely choose to present this value in minutes rather than hours. The value may be provided in a response at 716. In some embodiments, this may mean that the value is posted as an answer to a posted query. In some embodiments, a field for the attribute may be appended to a database table entry for the catalog entry or its browse node. The field may then be populated with the value.

Figure 8:
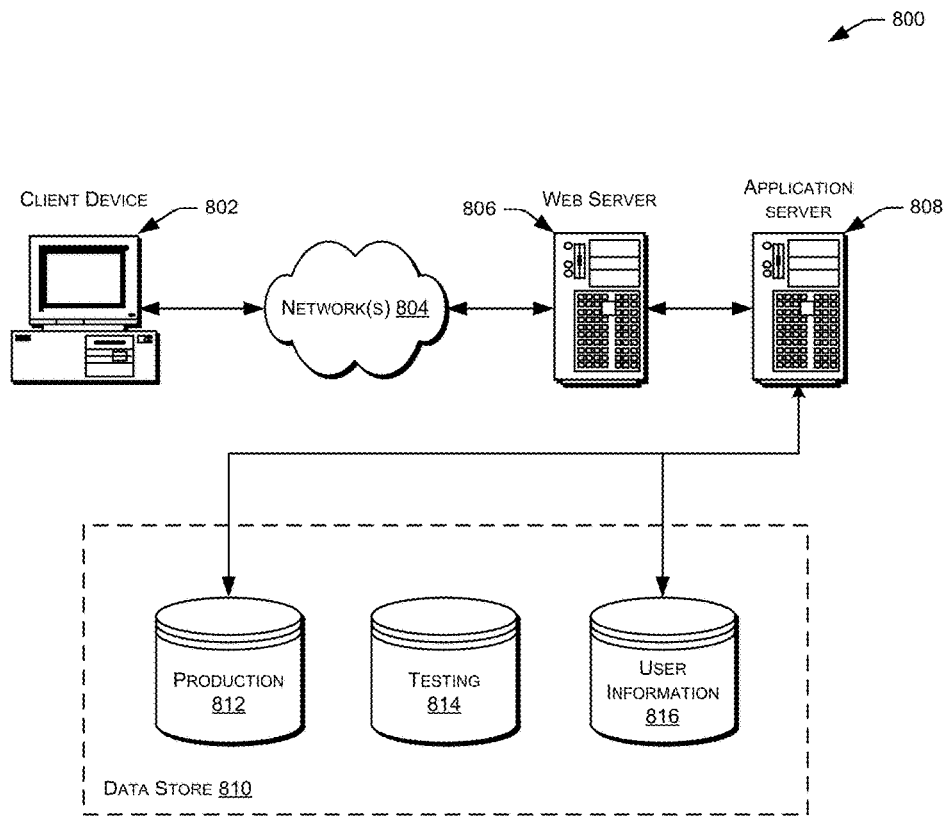
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a query related to a catalog entry and a structured attribute, the catalog entry belonging to a browse node of an electronic catalog including one or more items offered by an electronic marketplace, the query related to the catalog entry;
    determining, using at least one natural language processing technique, the structured attribute related to the received query based on unstructured text included in the query, wherein a database entry for the catalog entry lacks a data field explicitly associated with the structured attribute;
    generating, in the database entry for the catalog entry, the data field associated with the structured attribute;
    determining a unit category associated with the structured attribute;
    identifying a plurality of pieces of unstructured data associated with the catalog entry, individual pieces of unstructured data of the plurality of pieces of unstructured data having been submitted by different users of a plurality of different users;
    identifying, from at least one second piece of unstructured data of the plurality of pieces of unstructured data, a set of potential values for the at least one attribute based at least in part on individual potential values of the set of potential values being associated with the unit category;
    filtering, using a ruleset, the set of potential values to a likely candidate value;
    populating the data field associated with the structured attribute with the likely candidate value; and
    providing, in a response to the query, the likely candidate value.

2. The computer-implemented method of claim 1, wherein the ruleset is developed using one or more machine learning techniques.

3. The computer-implemented method of claim 2, wherein at least one value is filtered from the set of potential values using blacklist language.

4. The computer-implemented method of claim 2, wherein the one or more machine learning techniques are configured to determine a sentiment associated with the at least one second piece of unstructured data, the likely candidate value being selected from the set of potential values based at least in part on the determined sentiment.

5. The computer-implemented method of claim 3, wherein at least a portion of the ruleset is provided by an administrator.

6. A system comprising:
    a processor; and
    a memory including instructions that, when executed with the processor, cause the system to, at least:
    receive a first piece of unstructured data related to a catalog entry;
    determine, based at least in part on language used in the first piece of unstructured data, that the first piece of unstructured data is related to a query for at least one structured attribute and the catalog entry, wherein a database entry for the catalog entry lacks a data field explicitly associated with the structured attribute;
    generate, in the database entry for the catalog entry, the data field associated with the structured attribute;
    determine a unit category associated with the at least one structured attribute;
    identify at least one second piece of unstructured data associated with the catalog entry, individual pieces of unstructured data of the at least one second piece of unstructured data having been received from different users of a plurality of users;
    identify, from the at least one second piece of unstructured data, a set of potential values for the at least one structured attribute based on the potential values being formatted in accordance with the unit category;
    determine, from the set of potential values, a probable value for the at least one structured attribute;
    populate the data field associated with the structured attribute with the probable value; and
    provide, in response to the first piece of unstructured data, the probable value.

7. The system of claim 6, wherein the probable value is identified by applying language processing rules to remove potential values from the set of potential values.

8. The system of claim 6, wherein the second piece of unstructured data comprises at least one of a user comment, a user query, a user response to a query, or a user review of the catalog entry.

9. The system of claim 6, wherein the system further comprises instructions that cause the system to at least populate the field with the probable value.

10. The system of claim 6, wherein the system further comprises instructions that cause the system to at least provide the populated field to a client device for presentation.

11. The system of claim 6, wherein each of the set of potential values for the at least one structured attribute is assigned a priority, the probable value being determined by selecting the potential value in the set of potential values with a highest priority.

12. The system of claim 11, wherein the priority is assigned based on a number of occurrences of the potential value.

13. The system of claim 11, wherein the priority is assigned based on input from a user community.

14. A non-transitory computer readable medium storing specific computer-executable instructions that, when executed with a processor, cause a computer system to at least:
receive a request to process unstructured text data maintained by a service provider in association with a catalog entry;
determine, using one or more language processing techniques, a structured attribute associated with the unstructured text, the unstructured text data comprising at least a query for a value associated with the structured attribute, the catalog entry lacking a data field explicitly associated with the structured attribute;
generate, with respect to the catalog entry, the data field associated with the structured attribute;
determine a unit type associated with the structured attribute;
identify, by parsing additional unstructured text data associated with the catalog entry, potential values for the structured attribute based at least in part on matching the unit type, individual pieces of unstructured text data of the additional unstructured text data having been received from a plurality of users;
assign priorities to the potential values for the structured attribute using one or more rule sets;
provide a response to the received request including a potential value of the set of potential values having a highest priority; and
populate the data field associated with the structured attribute with the potential value.

15. The computer readable medium of claim 14, wherein the unit type is determined based at least in part on a unit category.

16. The computer readable medium of claim 14, wherein the priorities are assigned based at least in part on a likelihood associated with each potential value.

17. The computer readable medium of claim 14, wherein each potential value is a quantitative value identified by virtue of being paired with the unit type.

18. The computer readable medium of claim 14, wherein the response is posted with the unstructured text.

19. The computer readable medium of claim 18, wherein the unstructured text and response are made available to multiple users.

20. The system of claim 1, wherein the system further comprises instructions that cause the system to at least:
identify a number of additional catalog entries of the same category as the catalog entry; and
generate, in database entries for each of the number of additional catalog entries, a respective data field associated with the structured attribute.

\* \* \* \* \*